Figure 1:
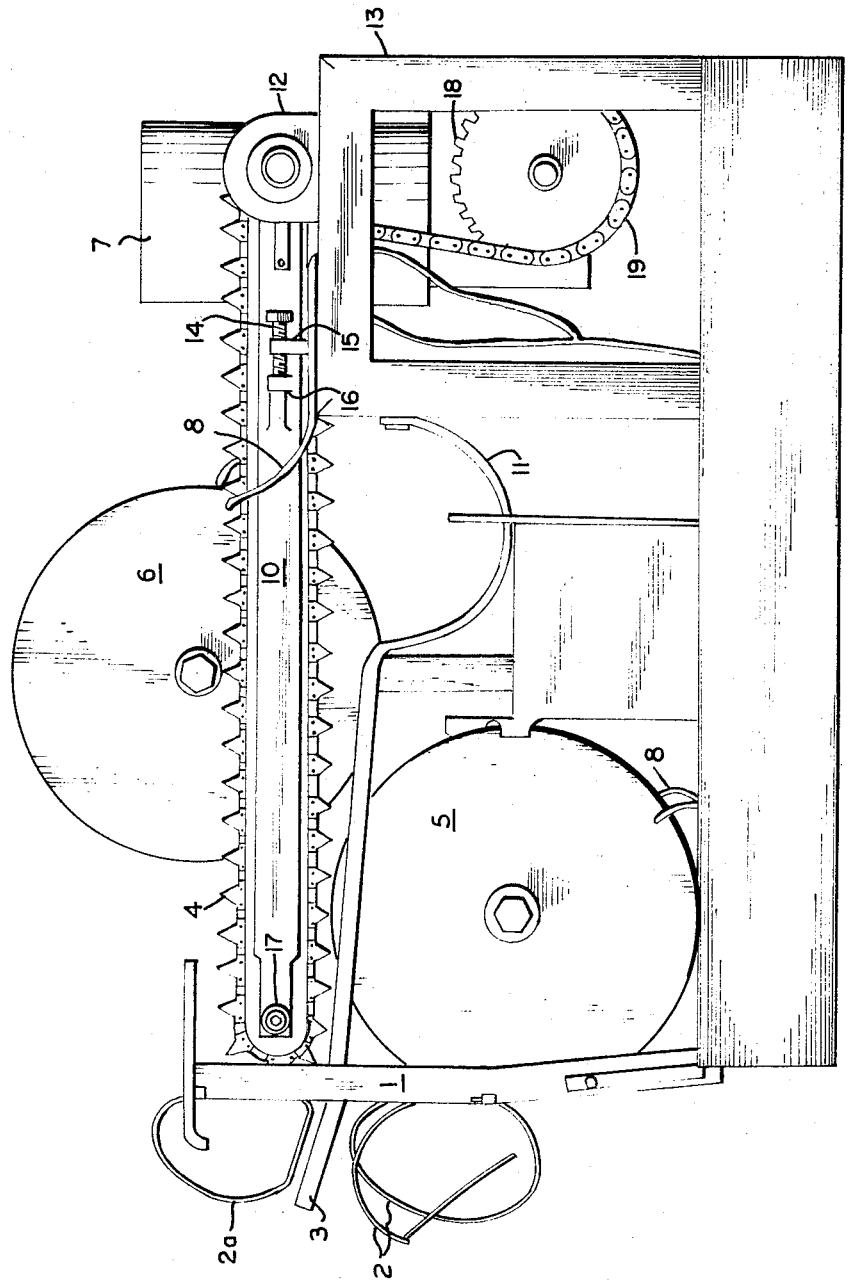

United States Patent
Lloyd et al.

[15] 3,662,430
[45] May 16, 1972

[54] SPLITTING MACHINE FOR CHICKEN

[72] Inventors: E. J. Lloyd; Rex E. Childs, both of Athens, Ga.

[73] Assignee: The United States of America as represented by the Secretary of Agriculture

[22] Filed: Feb. 3, 1970

[21] Appl. No.: 8,214

[52] U.S. Cl. .................................. 17/11, 17/23, 146/98
[51] Int. Cl. .......................................... A22c 21/00
[58] Field of Search ..................... 17/11, 23; 146/73, 98

[56] References Cited

UNITED STATES PATENTS

| 2,787,806 | 4/1957 | Jett et al. .................................. 17/11 |
| 2,941,238 | 6/1960 | Reeves ....................................... 17/11 |
| 2,941,560 | 6/1960 | McCaffery ........................... 146/98 X |
| 3,490,092 | 1/1970 | Harrison .................................. 17/11 |

Primary Examiner—Lucie H. Laudenslager
Attorney—R. Hoffman and W. Bier

[57] ABSTRACT

An apparatus and process are disclosed wherein the assembled components position, secure, and convey eviscerated carcasses of chicken and the like fowl past rotary knives to split the said carcasses into two parts (halves) efficiently and safely.

2 Claims, 5 Drawing Figures

INVENTORS
E.J. LLOYD
REX E. CHILDS

BY  R. Hoffman
ATTORNEY

SPLITTING MACHINE FOR CHICKEN

A non-exclusive, irrevocable, royalty-free license in the invention herein described, throughout the world for all purposes of the United States Government, with the power to grant sublicenses for such purposes, is hereby granted to the Government of the United States of America.

This invention relates to an apparatus and to a process for sectioning fowl. Particularly, this invention relates to an apparatus and process for positioning, holding, and splitting chicken carcasses into two parts. The segmented chicken carcasses would be readied for selective packaging by the expeditious process of the instant invention.

The main object of this invention is to provide the poultry industry with a more efficient means of preparing eviscerated carcasses for marketing.

A second object is to provide the poultry industry with a means of bisecting chicken and the like eviscerated carcasses which is safe to the person or persons operating the machinery of these meat processing plants.

In cutting up and dismembering poultry carcasses into their component parts, it has been the custom to hang carcasses by the hock joint or by one wing in shackles suspended from a monorail conveyor. The carcasses pass along a production line where one or more operators remove a single part by cutting it and/or disjointing the part with a butcher knife and discarding the part onto a moving conveyor belt or into a bin for transporting to the packing station. As the carcass proceeds down the production line, the wings are normally removed first, then cuts are begun about the abdominal part of the bird, and the breast portion is eventually cut away from the backbone. Then the leg portions are removed from the backbone section and finally the drumstick portion is cut away from the thigh portion. In other instances, the whole carcass may be cut up at one work station by use of a band saw or circular disk saw with the operator passing the carcass, or parts of the carcass, past the saw for each cut. The carcass may be cut into whatever portions or parts the customer desires. All of these cutting operations are hazardous to the employee because sharp knives and power saws are used for all cuts. The power saws, both the band saw and the circular disk saw, are extremely hazardous to employees since the hands and fingers must pass very close to the blade for each cut. The frequency rate and severity level of accidents are very high for these operations. In addition to the hazardous aspects of this normal and usual way of cutting up and dismembering poultry carcasses, a high and disproportionate labor requirement makes the further processing of poultry carcasses very costly. Also, human error in making each cut makes portion control difficult to maintain.

In accordance with this invention, there is provided an apparatus for alleviating the problems of high labor input and hazardous conditions. The apparatus holds the eviscerated carcass of a chicken, or like fowl, in the selected position, and conveys the carcass into the plurality of rotating circular disks. The blades split the carcass breast portion into halves and then splits the vertebra, thereby rendering the carcass into halves. The apparatus is so designed as to provide ample protection for the personnel operating around the machine as well as to the personnel feeding the carcasses.

The apparatus of this invention, which was designed for segmenting eviscerated poultry carcasses efficiently and safely, comprises essentially a. a plurality of spring wires for guiding and positioning a bird as it enters the machine,
b. a circular or cylindrical piece of metal primarily for supporting the plurality of spring wires,
c. a rectangular bar made of two metal strips upon which the carcass is impaled and upon which the carcass glides along,
d. a lower rotary knife blade for splitting the breast portion,
e. an upper rotary knife blade for splitting the vertebra,
f. two spike-tooth, power-driven drive chains for conveying the carcasses through cuts made by the apparatus,
g. suitable angle iron or other framework to provide support for the assembled component parts, and
h. a plurality of electric motors to drive the rotary knife blades and power chain.

Figure 2:
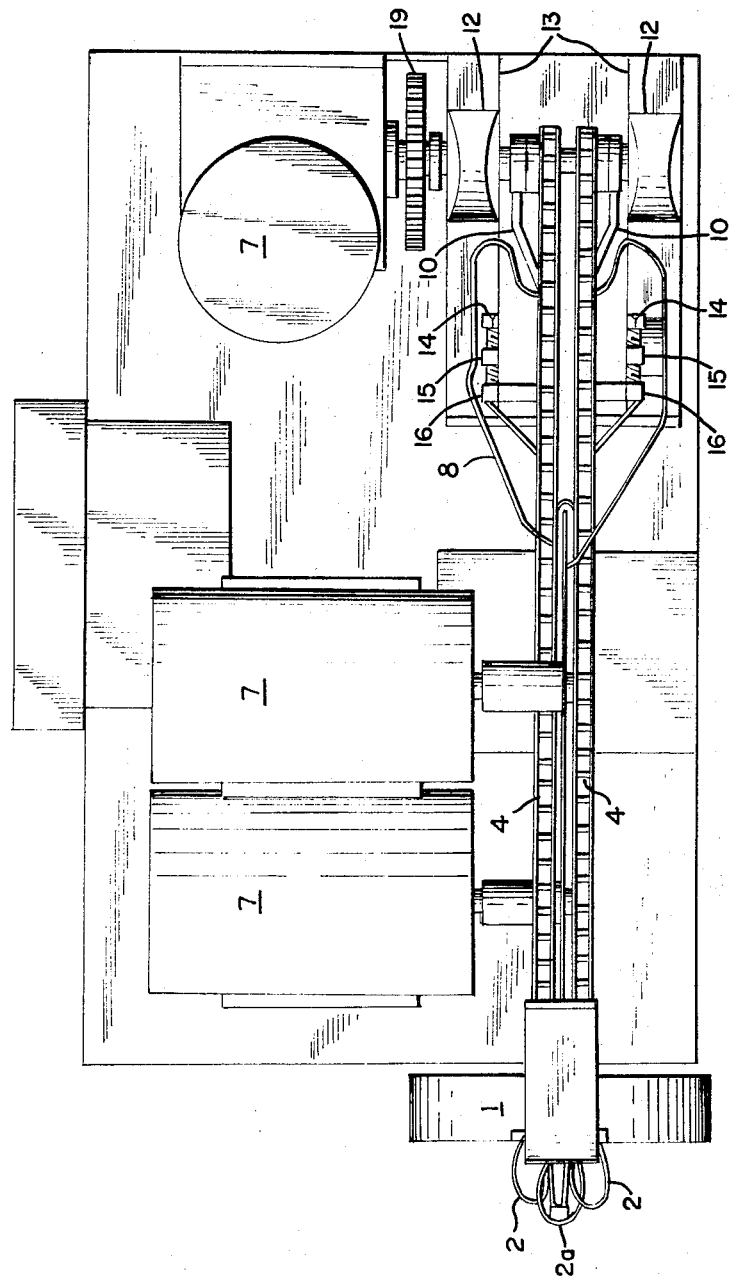
Figure 3:
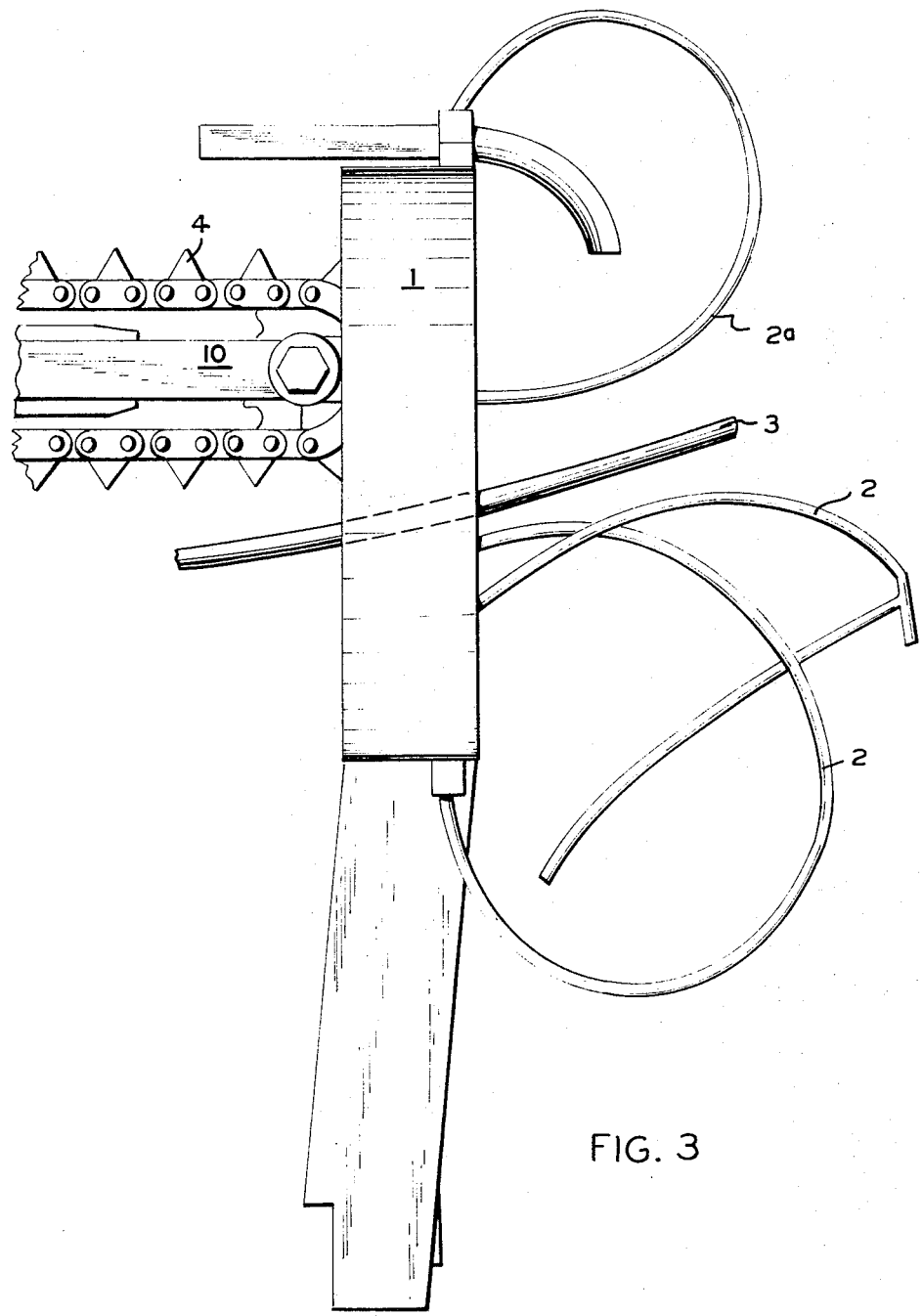
Figure 4:
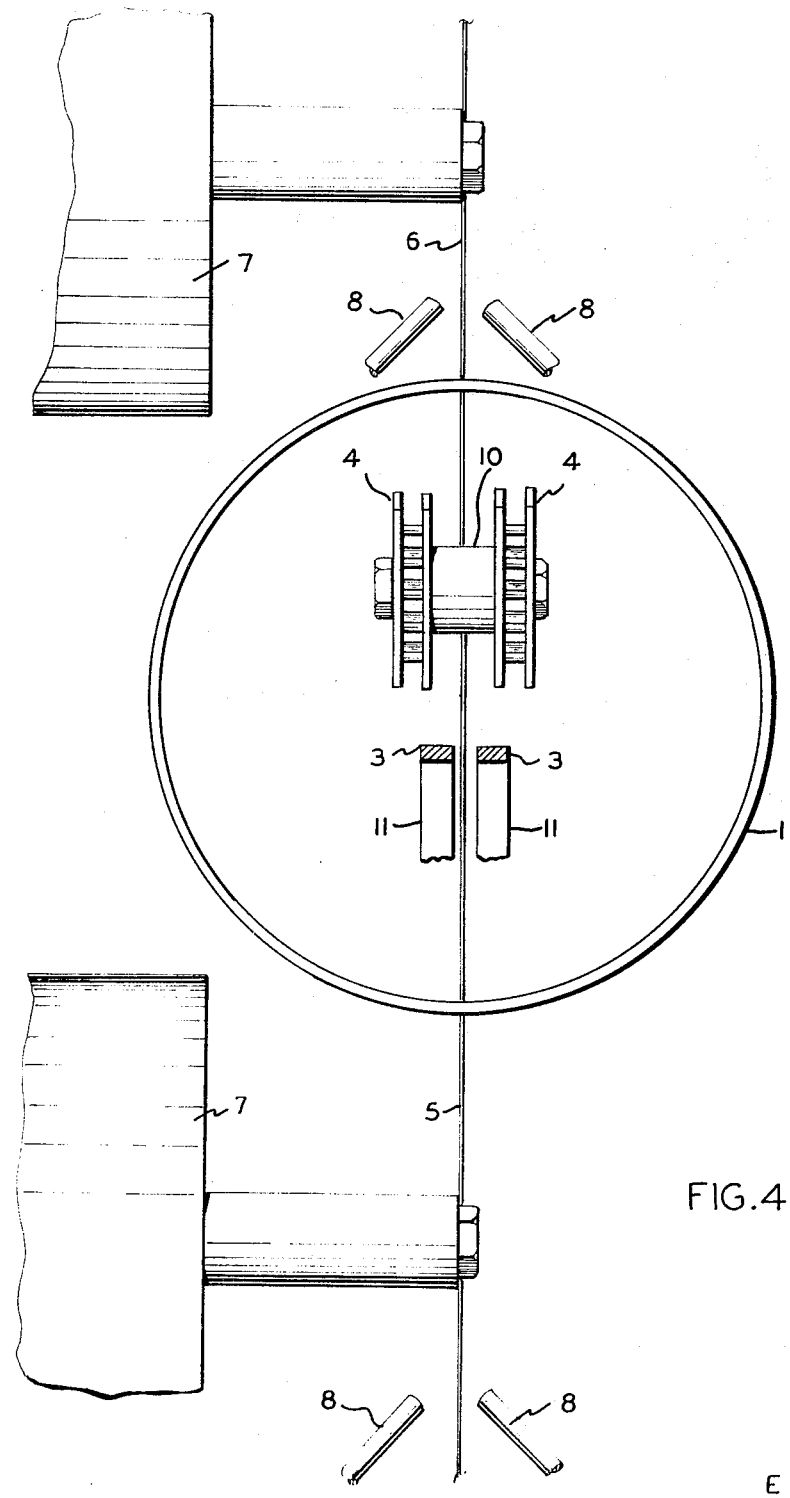
Figure 5:
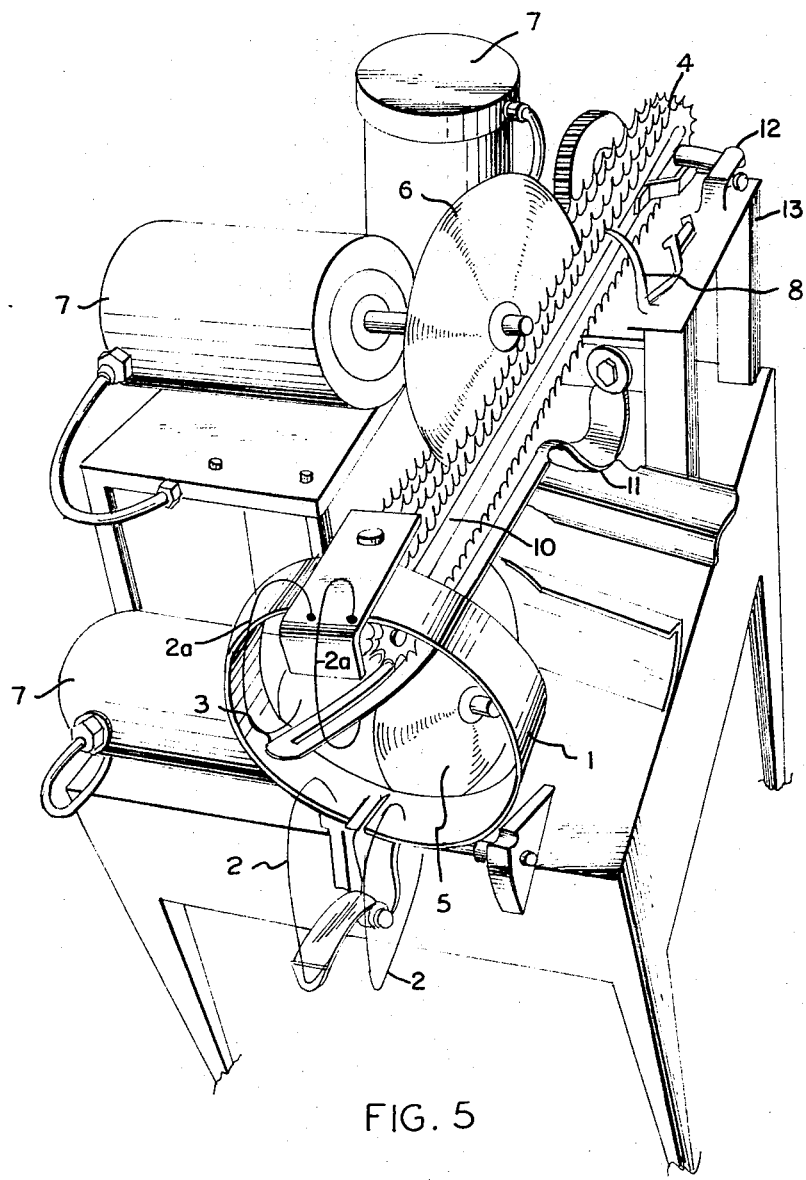

A preferred embodiment of the invention is illustrated in the accompanying drawings of which:

FIG. 1 is a side elevation.
FIG. 2 is a plan view.
FIG. 3 is a fragmentary enlarged side view of the front end of the apparatus.
FIG. 4 is an enlarged end view, with parts omitted showing the relative positions of the saw blades, the bar, and drive chains.
FIG. 5 is a perspective view of the chicken splitting machine.

Referring now to FIG. 1, the machine operates in the following manner:

The mouth of the machine, as shown in FIGS. 4 and 5, comprises a circular or cylindrical piece of metal 1, is which is used primarily for supporting spring steel wires 2a that guide and position the bird as it enters the machine, and as a safety precaution to keep operators from reaching too far into the machine. The chicken carcass which has been eviscerated is threaded breast down, front forward, onto a rectangular bar 3 and is pushed by the operator into the opening between the guidewires 2a for proper positioning under the spike-tooth power-driven chains 4. Supporting bar 3 is rectangular in shape and consists of two parallel metal strips with an opening between, as seen in FIG. 4. The backbone portion of the carcass glides along in this opening and is kept in line as it passes the lower knife blade 5 and the upper knife blade 6. As the carcass is pulled along through the device, it first contacts lower knife blade 5 that splits the breast portion. Then it proceeds along and contacts upper knife blade 6 that splits the vertebra, thus splitting the carcass in half. The parts drop into a container or out the bottom of the machine.

The device performs two of the most troublesome and expensive operations involved in cutting a carcass into various parts, namely, the splitting of the back and breastbones. It does this without the subjecting the operator to the knife edge blades or other hazards normally encountered in cutting up poultry.

Some novel features of the device are as follows:

As shown in FIGS. 1, 2, and 5, the power-driven spike-tooth drive chains are rigidly mounted on cantilever beam 10, but the rectangular bar 3 is rear mounted so that the front end will spring downward to adjust to different sized carcasses. Beam 10 is pivoted in trunions 12 which are mounted on frame members 13. The beam is kept rigid by means of a pair of bolts 14 passing through respective frame lugs 15 and beam lugs 16. The toothed chain 4 is mounted between forward bearing 17 and a rear bearing (not shown) on beam 10. Power is furnished to the chain through sprocket wheel 18 and chain 19 which also passes over another sprocket wheel (not shown) connected to the rear end of toothed chain 4. The rear portion of the bar behind the upper saw blade is bent into a semicircle 11 downward to give more stability and allow carcass parts to drop away from the chain after the carcass is split. A fine spray of water is directed onto the cutting saw blades by pipes 8 to prevent drying and hardening and thus a buildup of bone dust on the blades. Power-driven chains 4 can be quickly reversed in the event that the machine jams for any reason. Such reversal can be accomplished by anyone of several well-known mechanical expedients, e.g., a reversing clutch or by using a hydraulic motor to drive the chains. The rectangular shaped support bar 3 that is threaded through the carcass holds the carcass steady and guides it past the knife blades for consistent, accurate cuts.

The power to energize all power-driven devices has been electric motors 7; however, this should not be construed as a limiting factor since other forms of power can be used.

In the claims which follow, the terms "proximal" and "distal" are used to define the ends, respectively, at which the carcasses enter and leave the apparatus.

We claim:

1 Apparatus for bisecting eviscerated poultry carcasses comprising:

a. a rectangular framework defining a proximal and a distal end;
b. elongated rigid support means, free at its proximal end and secured at its distal end so as to provide flexibility to accommodate various size poultry;
c. conveyor means secured to the framework adjacent the elongated rigid support means and substantially coextensive therewith adapted to urge a poultry carcass on said support means from the proximal to the distal end thereof;
d. cylindrical support means on the proximal end of the framework providing safety to the hands of an operator, the cylindrical support means being secured to the rectangular framework transverse to the length thereof and in a vertical position so that the poultry will enter horizontally;
e. a plurality of shaped wires secured to said cylindrical support means, for guiding and positioning poultry carcasses on the proximal end of the said rigid elongated support means;
f. a first cutting means on the framework adjacent the proximal end thereof, adapted to and disposed so as to cut longitudinally through the central breast portion of a poultry carcass on the said support means;
g. a second cutting means situated above the elongated rigid support means intermediate the first cutting means and the distal end of the framework, adapted to and so disposed as to cut through the vertebra of the backbone portion of the carcass; and
h. means on the framework for cleaning each of the cutting means.

2. Apparatus for bisecting eviscerated poultry carcasses comprising:
a. a rectangular framework defining a proximal and a distal end;
b. spiked, endless conveyor means secured to the framework and coextensive therewith from the proximal to the distal end, said spiked, endless conveyor means being adapted to engage a carcass when said carcass is urged into contact with said conveyor means;
c. a vertical cylindrical member secured to the proximal end of the framework transverse to said conveyor means;
d. a flexibly supported rectangular bar free at the proximal end and secured to the framework at the distal end, said bar bent into a semicircle to allow carcass parts to drop from the conveyor means, and attached to the framework at the end of the semicircle thereby providing ample passage for a plurality of sizes of poultry carcasses;
e. a plurality of shaped wires adapted to guide and position a poultry carcass on the proximal end of said elongated support means, said wires being secured to said cylindrical member and so disposed as to position said carcass horizontally on said elongated support means;
f. a first rotary disc blade adjacent the proximal end of the framework in a common, longitudinal plane with but below the flexibly supported rectangular bar and the spiked conveyor means, said first disc blade and spiked conveyor including the flexibly supported rectangular bar between them, thereby to longitudinally cut ventrally through the center of the breast portion of a poultry carcass;
g. a second rotary disc blade adjacent the distal end of the framework in a common longitudinal plane with but above the flexibly supported rectangular bar and the spiked conveyor means, said second disc blade and spiked conveyor including the flexibly supported rectangular bar between them thereby to longitudinally cut dorsally through the center of the back portion of a poultry carcass;
h. means for rotating the first and second rotary disc blades attached thereto and to the framework; and
i. means for projecting a stream of water at each of the two blades.

* * * * *